United States Patent [19]

Schloegl et al.

[11] Patent Number: 5,091,237

[45] Date of Patent: Feb. 25, 1992

[54] TRANSPARENT SHRINK FILM BASED ON POLYPROPYLENE, PROCESS FOR ITS MANUFACTURE, AND ITS USE FOR SHRINK LABELS

[75] Inventors: Gunter Schloegl, Kelkheim; Lothar Bothe, Mainz-Gonsenheim; Guenther Crass, Taunusstein; Ursula Murschall, Nierstein; Herbert Peiffer, Mainz-Finthen, all of Fed. Rep. of Germany

[73] Assignee: Hoechst Aktiengesellschaft, Frankfurt am Main, Fed. Rep. of Germany

[21] Appl. No.: 371,300

[22] Filed: Jun. 26, 1989

[30] Foreign Application Priority Data

Jun. 25, 1988 [DE] Fed. Rep. of Germany ....... 3821581

[51] Int. Cl.$^5$ ............................................. B32B 7/02
[52] U.S. Cl. .................... 428/215; 428/349; 428/516; 428/519; 428/910; 525/240; 525/211; 525/192; 264/291
[58] Field of Search ............... 428/516, 349, 910, 519, 428/215; 525/240, 211, 192; 264/291

[56] References Cited

U.S. PATENT DOCUMENTS

| 4,352,849 | 10/1982 | Mueller | 428/213 |
| 4,378,404 | 3/1983 | Liu | 525/192 |
| 4,649,009 | 3/1987 | Shibata et al. | 264/235.8 |
| 4,766,178 | 9/1988 | Hwo | 525/240 |
| 4,769,421 | 9/1988 | Hwo | 525/240 |
| 4,786,533 | 11/1988 | Crass et al. | 428/349 |
| 4,927,885 | 5/1990 | Hayashida et al. | 525/211 |

FOREIGN PATENT DOCUMENTS 3735272 4/1988 Fed. Rep. of Germany.

*Primary Examiner*—Edith L. Buffalow
*Attorney, Agent, or Firm*—Foley & Lardner

[57] ABSTRACT

A shrink film comprising at least one polyolefinic layer comprising polypropylene and a resin admixture is disclosed. The film processes a shrinkability of more than 20%, measured at 90° C., in the transverse direction and of less than 8%, also measured at 90° C., in the longitudinal direction. The film is manufactured by coextrusion followed by stretching in the longitudinal and transverse directions, whereby stretching in the longitudinal direction is performed such that the birefringence value $\Delta n$ of the longitudinally oriented film does not exceed the range from $10 \times 10^{-3}$ to $13 \times 10^{-3}$.

30 Claims, No Drawings

TRANSPARENT SHRINK FILM BASED ON POLYPROPYLENE, PROCESS FOR ITS MANUFACTURE, AND ITS USE FOR SHRINK LABELS

BACKGROUND OF THE INVENTION

The present invention relates to a transparent shrinkable film comprising a base layer containing a mixture of polypropylene and hydrocarbon resin. The invention also relates to a process for manufacturing such a film and to the use of the film as shrink labels.

It is known from "Verpackungsrundschau" (Packaging Review) No. 10/1983, pp. 1121–1122, to surround cylindrical or substantially cylindrical packages, such as bottles or cans with overall labels; these labels, which entirely surround the circumferential surface of the packages are also known as sleeves. The films used for this purpose are, for example, made from polyethylene, polybutylene, polystyrene, copolymers of polyethylene and polypropylene, copolymers of ethylene and vinyl acetate or various blends, but in particular from polyvinyl chloride. To achieve the desired shrink properties in the circumferential direction of the sleeves, necessary for the intended use, the films usually are oriented by biaxial stretching. This may, for example, be performed using a bubble, stenter or calendar process, paying particular attention to the orientation in the transverse direction. To accomplish an absolutely crease-free, tight contact between the sleeve and the package, the shrink values measured after a treatment for about 15 minutes at 90° C. in a circulating air cabinet should be about 20 to 40% in the transverse direction ($s_t$) and not more than 6 to 8% in the longitudinal direction ($s_l$).

The sleeves are provided with prints, for example, by reverse side printing, and then converted into a tubing by gluing or welding. Due to the controlled transverse shrink, a tight, crease-free contact is created between the tube and the package in the shrink tunnel. The sleeves are applied automatically with the aid of brushes or manually. In addition to the desired shrink the sleeves must process the following properties: high gloss, clarity, good slip and stability (corresponding to the product of modulus of elasticity and thickness$^3$) for the automatic application of the sleeve, good printability and good welding/bonding characteristics.

Among the known films, PVC films are the films which, in accordance with U.S. Pat. No. 4,352,849, best fulfill the demands set forth above. Their high shrink capacities make them suitable for almost all applications. The shape or diameter of a package, in particular of a can or bottle, can vary up to 30% or even more in the surface area to which the sleeve is to be applied.

A particular disadvantage of PVS sleeves is their high price. The high price mainly results from the high density of 1.39 kg/dm$^3$, which is about 50% higher than the density of, for example, polypropylene. Furthermore, problems are encountered with regard to corrosion of the manufacturing and processing apparatus (see EP-A-O 233 400).

Polyolefinic films for shrink labels predominantly comprise blends of homo-, co- and terpolymers. To achieve the required shrink properties, the films are biaxially stretched by means of a bubble or stenter process.

Polylefinic shrink labels known from the art possess properties which may be undesirable during their processing for practical use, i.e., in most cases, their mechanical properties are poor and/or the process for accomplishing high transverse and low longitudinal shrinkage is very expensive and complicated.

Insufficient mechanical strength values are of particular disadvantage when automatic shrink appliances are used. To achieve satisfactory mechanical strength values, i.e., values comparable to those of PVC films, the thickness of polyolefinic film in some cases has to be increased by up to 50% or even more. This leads to correspondingly higher costs. Moreover, the shrink rate is slowed by the increased film thickness, so that it takes more time to achieve a predetermined final shrink value. A state-of-the-art process for achieving a high transverse shrink/longitudinal shrink ratio of polypropylene films is, for example, described in EP-A-O 171 733. This publication also discloses films of the type described at the outset, comprising copolymers of propylene and other alphaolefins and a resin admixture. According to this publication, a biaxially oriented film is produced in a two-stage process. To achieve a low shrinkage in the longitudinal direction, the film is subjected to an additional tempering treatment at an elevated temperature (about 130° C.) between the longitudinal stretching and the transverse stretching. This heat treatment is performed for a period of between 2 and 180 seconds. Depending on the advance speed of the film in the production line—usually 200 to 300 m/min—the process requires the installation of an expensive and complicated addition between the sections for longitudinal and transverse stretching, for at a tempering period of, for example, 60 seconds and a machine speed of 200 m/min, the oven would have to be 200 m long. Thus, the method is not suited for modern film production processes from the standpoint of process engineering. Moreover, the mechanical properties of the film are still not satisfactory.

SUMMARY OF THE INVENTION

It is therefore an object of the instant invention to develop a transparent multilayer film for sleeves based on polypropylene, that has good bonding and shrink properties and that combines very good optical and mechanical properties and therefore offers economic advantages over films known from the state of the art.

These and other objects according to the invention are achieved by a transparent shrinkable film comprising a base layer comprising about 60 to 95% by weight of a polypropylene polymer and about 5 to 40% by weight of a hydrogenated hydrocarbon resin having a softening point within the range from 60° to 125° C., the percentages being related to the total weight of the mixture, and a top layer of polypropylene on each of the two surfaces of said base layer, said top layers comprising about 60 to 100% by weight of a propylene polymer and about 0 to 40% by weight of a hydrogenated hydrocarbon resin having a softening point within the range from 90° to 145° C., the percentages being related to the total weight of the top layers.

DETAILED DESCRIPTION OF THE PREFERRED EMBODIMENTS

The propylene polymer of the base layer according to the invention is preferably an isotactic polypropylene having an n-heptane-soluble fraction of about 15% by weight or less, isotactic polypropylene with an n-heptane-soluble fraction of about 2 to 6% by weight being particularly preferred. Suitable propylene polymers preferably have a melt flow index (MFI) (determined in accordance with DIN 53 735 at 230° C. and under a load of 2.16 kg) of between about 0.5 g/10 min and 8 g/10 min, in particular of between about 1.5 g/10 min and 4 g/10 min.

The propylene polymer of the top layers is an isotactic polypropylene having an n-heptane-soluble fraction of about 15% by weight or less, isotactic polypropylenes with an n-heptane-soluble fraction of about 2 to 6% by weight being particularly preferred. The MFI of the propylene polymer used for the top layers is preferably higher than the MFI of the propylene polymer used for the base layer. Therefore, the MFI of propylene polymers suited for the top layers should be in the range of about 5 to 20 g/10 min.

The hydrocarbon resin, which in accordance with this invention is contained in the base layer of the film, is a low-molecular-weight synthetic resin. Its softening point, determined according to ASTM-E 28, is preferably in the range from about 70° C. to 90° C. Hydrocarbon resins of this type are usually prepared from resin-forming compounds, such as styrene, methyl styrene, vinyl toluene, indene, pentadiene, cyclopentadiene and the like. In accordance with this invention, preference is given to hydrogenated resins, in particular to hydrogenated cyclopentadiene resins having a Saybolt number (acc. to ASTM-D 158) greater than 20, and preferably greater than 25.

The resin, which is contained in the top layers in the amount specified above, can principally be the same as the resin contained in the base layer, but it has been found that it is advantageous for the resins employed for the top layers to have higher softening points, preferably in the range of about 110° C. to 135° C. Their chemical composition is identical to that of the above-specified resins having a lower softening range.

In a preferred embodiment, the top layers additionally contain an inorganic or organic slip agent. Examples of suitable slip agents are inorganic additives, such as silicon dioxide and calcium carbonate or the like. It is essential for the slip agent to have an average particle size of between about 1.5 $\mu$m and 3 $\mu$m and to have an aspect ratio of less than about 3. The refractive index of the slip agents is between about 1.4 and 1.6. $SiO_2$ and calcium carbonate are preferred slip agents. The added amount varies between about 0.1 and 0.5% by weight. The aspect ratio of the slip agent is defined as denoting the ratio of the longest extension to the shortest length of a particle. According to this definition, a cube-shaped slip agent has an aspect ratio of 1.

To improve certain other properties of the shrink film according to the invention, in particular the running properties during film production or processing, the layers may contain effective amounts of suitable components, preferably of antistatic agents and/or lubricants.

Preferred antistatic agents include essentially straight-chain, saturated aliphatic tertiary amines having aliphatic radicals with 10 to 20 carbon atoms and being substituted by 2-hydroxyalkyl-($C_1$ to $C_4$) groups. Preferred amines are N,N-bis-(2-hydroxyethyl)-alkylamines having 10 to 20, preferably 12 to 18, carbon atoms in their alkyl groups. The effective amount of antistatic agent varies in the range from about 0.05 to 1% by weight, relative to the weight of the layer.

It has been found to be particularly advantageous to add to the top layer about 0.1 to 0.7% by weight of an N,N-bis-ethoxyalkylamine with an aliphatic radical having 10 to 20 carbon atoms.

Examples of suitable lubricants include higher aliphatic acid amides, higher aliphatic acid esters, waxes, metallic soaps and polydimethylsiloxane. The effective added amount of lubricant varies between about 0.1 and 2% by weight, relative to the weight of the layer. The addition of about 0.15 to 0.25% by weight of a higher aliphatic acid amine (e.g., erucic acid amide) to the base layer and/or to the top layers has proved to be very advantageous. Excellent results are achieved when polydimethylsiloxane is added to one or both top layers. In this case, the added amount preferably varies between about 0.5 and 1.5% by weight, and the polydimethylsiloxane employed has a viscosity of between about 1,000 and 100,000 $mm^2/s$.

The film according to this invention has a thickness of between about 15 and 50 $\mu$m, preferably of about 20 to 45 $\mu$m, whereby the top layers have a thickness of about 0.5 to 1.0 $\mu$m each.

The film according to the present invention, which in respect of its chemical composition has been described above, is distinguished by highly desirable shrink properties. The shrink of the film in the transverse direction is higher than about 20% at 90° C. and higher than about 40% at 120° C., whereas at the same time the shrink in the longitudinal direction is less than about 8% at 90° C. and less than about 16% at 120° C., whereby the percentages are in each case related to the dimensions of the film prior to the shrinking treatment. The shrink values were in each case determined in a circulating air cabinet during 15 minutes, in accordance with DIN 40 634. The film according to the invention preferably has shrink values, in the transverse direction, of about 20 to 30% at 90° C. and of about 40 to 60% at 120° C., and the preferred shrink values in the longitudinal direction are not more than about 4 to 8% at 90° C. and not more than about 10 to 16% at 120° C., in each case related to the dimensions of the film prior to the shrink treatment.

Apart from these excellent shrink properties, the film according to this invention also possesses very desirable mechanical properties. The modulus of elasticity is determined by means of a tensile strength tester, type No. 1445, from Messrs. Zwick, Ulm, West Germany, in accordance with DIN 53 455. Employing this method, the moduli of elasticity determined for the film of this invention are more than about 2,000 $N/mm^2$, preferably between about 2,200 and 2,600 $N/mm^2$, in the longitudinal direction and more than about 4,000 $N/mm^2$, preferably between about 4,500 $N/mm^2$ and 5,500 $N/mm^2$, in the transverse direction.

Another physical parameter used to express the mechanical properties of the film is the tensile strength, which is also determined according to DIN 53 455. The shrink film of this invention possesses a tensile strength of more than about 130 $N/mm^2$, preferably in the range from about 145 to 185 $N/mm^2$, in the longitudinal direction, and of more than about 220 $N/mm^2$, preferably in the range from about 235 to 290 $N/mm^2$, in the transverse direction.

The optical properties of the film of this invention are particularly good. The gloss value is in the range of about 110 to 130, determined in accordance with DIN 67 530 or ASTM-D 523, respectively, and the haze of the film is less than about 20%, in particular between about 10 and 15%, determined in a way similar to the method of ASTM-D 1003-52. In lieu of a 4° round aperture diaphragm, a 1° slot aperture diagram is used, and the haze, in percent, is stated for four superimposed film layers which were selected to exploit the optimum measuring range. Due to the very high gloss of the film according to this invention, an excellent advertising effectiveness is achieved. Therefore, the film of this invention is employed with particular advantage for applications where the labelling (slipping over and shrinkage) is performed automatically and where the optical appearance of the product (can/bottle/dispenser) is of great importance.

The object of this invention as defined at the outset is also achieved by a process for the manufacture of the described film. The process of this invention comprises first producing a prefilm by extrusion or coextrusion through a slot die, solidifying this prefilm on a chilling roll and subsequently orienting the resulting film by stretching it in the longitudinal and in the transverse directions. In accordance with this invention the conditions for the longitudinal stretching are set such that the degree of orientation in the longitudinal direction is low. These are very favorable preconditions for achieving a high shrink in the transverse direction and a low shrink in the longitudinal direction. A customary measure for evaluating the degree of orientation of the film stretched in the longitudinal direction is the birefringence index $\Delta n$. In accordance with this invention the birefringence index $\Delta n$ of the film stretched in the longitudinal direction, but not yet stretched in the transverse direction does not exceed about $10 \times 10^{-3}$ to $13 \times 10^{-3}$. Preferably the birefringence index $\Delta n$ should be less than about to $8 \times 10^{-3}$. Stretching in the longitudinal direction is performed at a temperature above about 145° C., preferably between about 145° and 165° C., and at a stretching ratio of less than about 4.5, preferably in the range of about 3 to 4.

Surprisingly, it has been discovered that under these conditions the temperature for transverse stretching $T_t$ can be selected considerably below the customary temperatures, without any adverse effect on the film processing properties. In accordance with this invention, stretching in the transverse direction is performed at a temperature of less than about 120° C., preferably of less than about 110° C. According to the invention, the stretching ratio in the transverse direction is more than about 8, and preferably it is in the range from about 8.5 to 11.

The stretching of the film in the transverse direction is followed by a final setting step. During this step, the film is conveyed on in the stenter frame, optionally in a slightly converging manner, while the temperature is kept about 20° to 40° C. below the stretching temperature. In particular, the temperature is below about 110° C., and most preferably it is below about 80° C. The frame convergence during the setting step preferably is about 5 to 15%.

It should be pointed out that due to the manufacturing process of this invention, the incorporation of low-molecular weight additives (carboxylic acid amides, N,N-bis-ethoxyalkylamines) into the top layers can be performed without significant technical difficulties. No problems in respect of material exudation and deposition in the transverse stenter frame are encountered. Due to the process conditions of this invention, any distributing blooming of resins is avoided.

Printability and good bonding properties of the film are achieved by subjecting the film to any one of the customary surface treatments, for example, a flame treatment or an electrical corona treatment, prior to the winding step.

Customary methods are employed for the corona treatment, which is expediently performed such that the film is passed between two conductive elements serving as electrodes, while a high voltage, in general an alternating voltage (about 10,000 V and 10,000 Hz), is applied to the electrodes, the voltage being sufficient to initiate spray or corona discharges. By these spray or corona discharges the air above the film surface is ionized and combines with the molecules present on the film surface, so that polar inclusions are obtained in the essentially nonpolar polymer matrix.

The treatment intensities are within the customary limits. Preference is given to intensities between about 38 and 42 mN/m.

The prints on the film are usually produced by reverse side printing.

The shrink film manufactured in this way possesses a combination of properties making it highly suitable for its intended use as a film for sleeves. A particularly preferred field of application is for cans or bottles where the dimensional changes in the areas to be surrounded by sleeves are below about 25%.

The film according to this invention which has been described in detail above, will be further illustrated by means of the Example which follows.

EXAMPLE

A multilayer film consisting of a base layer comprising 90% by weight of an isotactic polypropylene and 10% by weight of a hydrogenated cyclopentadiene resin having a softening temperature of 85° C., and of top layers comprising isotactic polypropylene with an admixture of 0.3% by weight of $CaCo_3$ having a mean particle size of 2 $\mu$m and an aspect ration of 1, 0.5% by weight of N,N-bis-ethoxyalkylamine (®Armostat 300) and 0.7% by weight of polydimethylsiloxane having a viscosity of 30,000 cSt, is manufactured by coextrusion, chilling, longitudinal stretching, transverse stretching, and heat-setting. The total film thickness is 30 $\mu$m, and the top layers have a thickness of 0.8 $\mu$m each. The following process conditions are set for the individual steps:

| Extrusion: | Temperature of the melts 270° C. Temperature of chilling roll 60° C. |
|---|---|
| Longitudinal stretching: | Temperature $T_1$ = 155° C. Stretching ratio = 4.0 |
| Transverse stretching: | Temperature $T_t$ = 105° C. Stretching ratio = 10 |
| Setting: | Temperature $T_2$ = 70° C. Duration t = 1 s |

The film produced in this way had the properties listed in the last line of the Table below. Prior to winding, the film was subjected to a corona treatment, in order to ensure good printability and bonding properties. The treatment intensity was 39 mN/m.

In the Table, the film according to this invention was compared to a PVC film, to a film produced in accordance with EP-A-O 171 733 and to a polypropylene film produced under substantially the same conditions as the film according to this invention, but without the resin admixture. A comparison of the properties specified in the Table shows that the film of this invention is superior to all known films, particularly with regard to the combination of properties constituting an object of this invention.

The detailed description and the specific examples, while indicating preferred embodiments of the invention, are given by way of illustration only, since various changes and modifications within the spirit and scope of the invention will become apparent to those skilled in the art from this detailed description.

TABLE

| Film | Shrink (%) 15 min, hot air transv./longit. 90° C. | 120° C. | E-Modul. ($\frac{N}{mm^2}$) longit. | transv. | Tear Strength ($\frac{N}{mm^2}$) longit. | transv. | Haze (%) | Gloss | Density (kg/m³) | Thickness at same stiffness (μm) |
|---|---|---|---|---|---|---|---|---|---|---|
| PVC | 50/6 | 52/6 | 2700 | 3700 | 60 | 110 | 5 | 120 | 1390 | ~30 |
| EP-A-O 171 733 | 100° C. 38/10 | 5 min | ~1500 | ~1500 | 145 | 120 | >20 | <100 | ~900 | ~40 |
| Polypropylene | 10/6 | 20/9 | 2200 | 4500 | 170 | 300 | 30 | 105 | 900 | ~31 |
| Film acc. to this invention | 25/5 | 45/8 | 2300 | 4700 | 160 | 270 | 15 | 120 | 900 | 30 |

What is claimed is:

1. Transparent shrinkable film comprising:
    a base layer comprising a mixture of about 60 to 95% by weight of a propylene polymer and about 5 to 40% by weight of a hydrogenated hydrocarbon resin having a softening point in the range from 60° to 125° C., the percentages being related to the total weight of the mixture employed for the base layer, and
    a top layer on each of the two surfaces of said base layer comprising a propylene polymer and a hydrogenated hydrocarbon resin having a softening point in the range of 90° to 145° C., said top layers comprising about 60 to 100% by weight of the propylene polymer and up to 40% by weight of the hydrogenated hydrocarbon resin, the percentages being related to the total weight of the top layers, said film being a shrinkable film which is stretched in the longitudinal and transverse directions and has a low degree of orientation in the longitudinal direction.

2. Film as claimed in claim 1, wherein the propylene polymer of the base layer comprises an isotactic polypropylene with an n-heptane-soluble fraction of 10% by weight or less and having a melt flow index of about 0.5 g/10 min to 8 g/10 min, at 230° C. and under a load of 2.16 kg.

3. Film as claimed in claim 1, wherein the propylene polymer of the top layers comprises an isotactic polypropylene with an n-heptane-soluble fraction of 10% by weight or less and having a melt flow index in the range of about 5 g/10 min. to 20 g/10 min.

4. Film as claimed in claim 1, wherein the hydrogenated hydrocarbon resin in said base layer is a low-molecular-weight synthetic resin having a softening point in the range of 70° to 90° C.

5. Film as claimed in claim 4, wherein the hydrogenated hydrocarbon resin comprises a hydrogenated cyclopentadiene resin.

6. Film as claimed in claim 1, wherein the top layers additionally comprise an inorganic or organic slip agent.

7. Film as claimed in claim 6, wherein the slip agent comprises silicon dioxide or calcium carbonate having a mean particle size of between 1.5 and 3 μm and an aspect ratio in the range of 1 to 4.5, that is present in an amount of 0.1 to 0.5% by weight.

8. Film as claimed in claim 1, having a thickness of about 15 to 50 μm, with the top layers being 0.5 to 1.0 μm thick.

9. Film as claimed in claim 8, having a thickness of about 20 to 45 μm.

10. Film as claimed in claim 1, having a shrinkability in the transverse direction of more than about 20% at 90° C. and of more than about 40% of 120° C., and a shrinkability in the longitudinal direction of less than about 8% at 90° C. and of less than about 16% at 120° C., the percentages being in each case related to the dimensions of the film prior to the shrink process.

11. Film as claimed in claim 10, having a shrinkability in the transverse direction of about 20% to 30% at 90° C. and of about 40% to 60% at 120° C., and a shrinkability in the longitudinal direction of not more than 4% to 8% at 90° C. and of not more than 10% to 16% at 120° C., the percentages being in each case related to the dimensions of the film prior to the shrink process.

12. Film as claimed in claim 1, having a modulus of elasticity in the longitudinal direction of more than about 2,000 N/mm², and a modulus of elasticity in the transverse direction of more than about 4,000 N/mm².

13. Film as claimed in claim 12, having a modulus of elasticity in the longitudinal direction of about 2,200 to 2,600 N/mm² and a modulus of elasticity in the transverse direction of about 4,500 N/mm² to 5,500 N/mm².

14. Film as claimed in claim 1, having a tear resistance in the longitudinal direction of more than about 130 N/mm², and a tear resistance in the transverse direction of more than about 220 N/mm².

15. Film as claimed in claim 4, having a tear resistance in the longitudinal direction of about 145 to 185 N/mm² and a tear resistance in the transverse direction of about 235 to 290 N/mm².

16. Process for the manufacture of a transparent shrinkable film as claimed in claim 1, comprising the steps of:
    first producing a prefilm comprising a base layer that is a mixture of about 60 to 95% by weight of a propylene polymer and about 5 to 40% by weight of a hydrogenated hydrocarbon resin having a softening point in the range from 60° to 125° C., the percentages being related to the total weight of the mixture employed for the base layer, and a top layer on each of the two surfaces of said base layer, said top layers comprising about 60 to 100% by weight of a propylene polymer and about 0 to 40% by weight of a hydrogenated hydrocarbon resin having a softening point in the range of 90° to 145° C., the percentages being related to the total weight of the top layers; and
    subsequently orienting the resulting film by stretching it in the longitudinal and in the transverse directions, during which the conditions for the longitudinal stretching are set such that the degree of orientation of the film stretched only in the longitudinal direction is low.

17. Film as claimed in claim 1, wherein the hydrogenated hydrocarbon resin in said top layers is a low-molecular-weight synthetic resin having a softening point in the range of 110° to 135° C.

18. Film as claimed in claim 4, wherein the hydrogenated resin in said top layers is a low-molecular-weight synthetic resin having a softening point in the range of 110° to 135° C.

19. Film as claimed in claim 18, wherein the propylene polymer of the base layer comprises an isotactic polypropylene with an n-heptane-soluble fraction of 10% by weight or less and having a melt flow index of about 1.5 g/10 min to 4 g/10 min, at 230° C. and under a load of 2.16 kg.

20. Film as claimed in claim 19, wherein the hydrogenated resin is a cyclopentadiene resin having a saybolt number greater than 20.

21. Film as claimed in claim 1, wherein the top layer comprises at least about 0.5% by weight of the hydrogenated hydrocarbon resin having a softening point in the range of 90° to 145° C.

22. Process for the manufacture of a film as claimed in claim 16, comprising the steps of:
first producing a prefilm by coextrusion through a slot die;
solidifying said prefilm on a chilling roll, and
subsequently orienting the resulting film by stretching it in the longitudinal and in the transverse directions, during which the conditions for the longitudinal stretching are set such that the degree of orientation of the film stretched only in the longitudinal direction is low.

23. Process as claimed in claim 22, wherein the birefringence of the film stretched in the longitudinal direction, but not yet stretched in the transverse direction does not exceed a value $\Delta n$ of $10 \times 10^{-3}$ to $13 \times 10^{-3}$.

24. Process as claimed in claim 22, wherein stretching in the longitudinal direction is performed at a temperature about 140° C., at a stretching ratio of less than 4.5, and wherein stretching in the transverse direction is performed at a temperature below about 120° C., and at a stretching ratio in the transverse direction of more than about 8.

25. Process as claimed in claim 22, wherein stretching of the film in the transverse direction is followed by a final setting step, during which the film is conveyed on in the tenter frame, at a temperature that is about 20° C. to 40° C. below the stretching temperature.

26. Process as claimed in claim 24, wherein stretching in the longitudinal direction is performed at a temperature in the range of about 145° to 155° C. and at a stretching ratio of about 3 to 4, and wherein stretching in the transverse direction is performed at a temperature below about 110° C. and at a stretching ratio in the range of 8.5 to 11.

27. Process as claimed in claim 25, wherein the temperature during the final setting step is below about 110° C.

28. Process as claimed in claim 27, wherein the temperature during the final setting step is below about 80° C.

29. Process as claimed in claim 25, wherein the film is conveyed on the tenter frame in a slightly converging manner.

30. Process as claimed in claim 29, wherein the convergence during the setting step is in the range of about 5 to 15%.

* * * * *

UNITED STATES PATENT AND TRADEMARK OFFICE
CERTIFICATE OF CORRECTION

PATENT NO. : 5,091,237
DATED : February 25, 1992
INVENTOR(S) : Gunter SCHLOEGL et al.

It is certified that error appears in the above-indentified patent and that said Letters Patent is hereby corrected as shown below:

Claim 10, Column 8, line 8, "40% of" should read --40% at--.

Claim 24, Column 10, line 7, "about" should read --above about--.

Signed and Sealed this

Twenty-seventh Day of September, 1994

Attest:

BRUCE LEHMAN

Attesting Officer    Commissioner of Patents and Trademarks